(12) United States Patent
Kempeneers (10) Patent No.: US 11,249,271 B2
(45) Date of Patent: Feb. 15, 2022

(54) SPIRALED RE-ADHERABLE PIGTAILS

(71) Applicant: COMMSCOPE TECHNOLOGIES LLC, Hickory, NC (US)

(72) Inventor: Dirk Kempeneers, Aarschot (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/967,359

(22) PCT Filed: Feb. 5, 2019

(86) PCT No.: PCT/US2019/016679
§ 371 (c)(1),
(2) Date: Aug. 4, 2020

(87) PCT Pub. No.: WO2019/153003
PCT Pub. Date: Aug. 8, 2019

(65) Prior Publication Data
US 2021/0033812 A1    Feb. 4, 2021

Related U.S. Application Data (60) Provisional application No. 62/626,343, filed on Feb. 5, 2018.

(51) Int. Cl.
G02B 6/44 (2006.01)
(52) U.S. Cl.
CPC .................. *G02B 6/4457* (2013.01)
(58) Field of Classification Search
CPC .......................... G02B 6/4458; G02B 6/4457
See application file for complete search history.

(56) References Cited

U.S. PATENT DOCUMENTS

| | | | |
|---|---|---|---|
| 4,950,049 A | 8/1990 | Darsey et al. | |
| 5,052,632 A * | 10/1991 | Stokes, Jr. | B65H 55/04 |
| | | | 242/476.7 |
| 5,179,613 A | 1/1993 | Cronk | |
| 5,261,023 A | 11/1993 | Darsey | |

(Continued)

FOREIGN PATENT DOCUMENTS

| | | |
|---|---|---|
| CN | 201397410 Y | 2/2010 |
| CN | 102317189 A | 1/2012 |
| JP | H10-090527 A | 4/1998 |

OTHER PUBLICATIONS

International Search Report and Written Opinion of the International Searching Authority for International Patent Application No. PCT/US2019/016679 dated May 30, 2019, 9 pages.

*Primary Examiner* — Ryan A Lepisto
*Assistant Examiner* — Erin D Chiem
(74) *Attorney, Agent, or Firm* — Merchant & Gould P.C.

(57) ABSTRACT

The present disclosure relates to a telecommunications device for dispensing fiber optic patch cord cables. The device has a management body (i.e., securing structure) with adhesive disposed on opposite sides thereof. A first length of fiber optic patch cord cable is wound on a first side of the management structure in a first spiral coil portion and a second length of fiber optic patch cord cable is wound on a second side of the management structure in a second spiral coil portion. The first and second spiral coil portions can be peelable and re-adherable to the management body.

20 Claims, 7 Drawing Sheets

(56) References Cited

U.S. PATENT DOCUMENTS

| | | | | |
|---|---|---|---|---|
| 5,600,719 | A * | 2/1997 | Lovecky | H02G 11/02 |
| | | | | 379/438 |
| 5,781,301 | A | 7/1998 | Ruffin | |
| 5,971,317 | A * | 10/1999 | Jaros | B65H 75/14 |
| | | | | 242/607 |
| 6,533,216 | B1 * | 3/2003 | Bumgarner | B65H 75/14 |
| | | | | 242/118.41 |
| 7,000,863 | B2 * | 2/2006 | Bethea | G02B 6/4457 |
| | | | | 242/388.1 |
| 7,017,721 | B1 * | 3/2006 | Bradford | H02G 11/02 |
| | | | | 191/12.4 |
| 7,477,806 | B2 | 1/2009 | Williams | |
| 7,533,841 | B1 * | 5/2009 | Harrison | B65H 75/14 |
| | | | | 242/388.5 |
| 10,662,022 | B2 * | 5/2020 | Akamatsu | G02B 6/4457 |
| 2006/0257086 | A1 | 11/2006 | Ohsono et al. | |
| 2007/0036506 | A1 | 2/2007 | Kewitsch | |
| 2008/0035778 | A1 * | 2/2008 | Belden | A45F 5/004 |
| | | | | 242/375 |
| 2015/0177473 | A1 * | 6/2015 | Smith | G02B 6/3897 |
| | | | | 385/134 |
| 2017/0139169 | A1 * | 5/2017 | Lecoq | G02B 6/4446 |

* cited by examiner

SPIRALED RE-ADHERABLE PIGTAILS

CROSS-REFERENCE TO RELATED APPLICATION

This application is a National Stage Application of PCT/US2019/016679, filed on Feb. 5, 2019, which claims the benefit of U.S. Patent Application Ser. No. 62/626,343, filed on Feb. 5, 2018, the disclosures of which are incorporated herein by reference in their entireties. To the extent appropriate, a claim of priority is made to each of the above disclosed applications.

TECHNICAL FIELD

The present disclosure relates to patch cords for the telecommunications industry. More particularly, this disclosure relates to the management of patch cords with fiber optic connectors in a patching environment.

BACKGROUND

In the telecommunications industry, patch cords are widely used to connect various pieces of equipment. For example, in well-known cross-connect applications, a patch cord may be used to extend between two jack fields. For DS-3 signal rates, patch cords made of coaxial cables are used. The ends of the patch cords are provided with plugs which are received within jacks contained in the two jack fields. In fiber optic installations, a fiber optic patch cord is used extending between fiber optic connectors.

Frequently, telecommunications facilities (such as central office locations) will have a large number of patch cords extending between various pieces of equipment. These patch cords typically have a single strand of optical fiber encased in a suitable jacket. Another type of fiber optic patch cord is a ribbon cable having multiple strands of optical fibers.

In certain patch cord environments, there may be multiple numbers of such patch cords connecting multiple types of equipment together. Normally these patch cords come in fixed lengths and these fixed length patch cords can lead to extra length cord hanging between equipment. Similarly, the fixed length of such patch cords may require multiple patch cords to be connected together to provide the desired length. Because of these concerns, it is often quite difficult to manage such patch cords and their lengths.

The resulting patch cords can lead to some unfortunate results as limbs and equipment can easily get entangled in these cords. Furthermore, the tangled patch cords can make the tracing of connections difficult at best.

From the above, it is therefore clear that a device for managing patch cords is needed. Such a device can be simple to use, simple to store, convenient and easy to deploy.

SUMMARY

The present disclosure relates to a telecommunications device for dispensing fiber optic patch cord cables. The device has a management body (i.e., securing structure) with adhesive disposed on opposite sides thereof. A first length of fiber optic patch cord cable is wound on a first side of the management structure in a first spiral coil portion and a second length of fiber optic patch cord cable is wound on a second side of the management structure in a second spiral coil portion. First and second fiber optic connectors can be respectively mounted on ends of the first and second spiral coil portions of the fiber optic patch cord cable such that the first and second fiber optic connectors are respectively positioned on an outer diameter of the first and second spiral coil portions. The first and second spiral coil portions can be peelable and re-adherable to the management body.

In a preferred embodiment, the management structure can define a central opening through which the patch cord fiber optic cable can be routed therethrough. In alternate embodiments, the management structure may not have an central opening defined therein.

To use the device, the first and second fiber optic connectors of the fiber optic patch cord cable can be pulled from respective outer diameters of the first and second spiral coils thereby unwinding the first and second lengths of the fiber optic patch cord cable from the management structure. The re-adherable adhesive provides for rewinding the first and second lengths of the fiber optic patch cord cable on the management structure so that once the user is done with a desired length of the fiber optic patch cord cable, the extended or excess length of the fiber optic patch cord cable can be rewound and stored on the management structure. With this device, a user merely pulls the required length of fiber optic patch cord cable from the management structure and attaches the first and second fiber optic connectors to desired equipment, thereby only using the desired length of fiber optic patch cord cable. Excess lengths of fiber optic patch cord cable are thus avoided as the device stores such unwanted lengths of fiber optic patch cord cable on the management structure. The device also provides for management of the fiber optic patch cord cable during shipping and storing.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
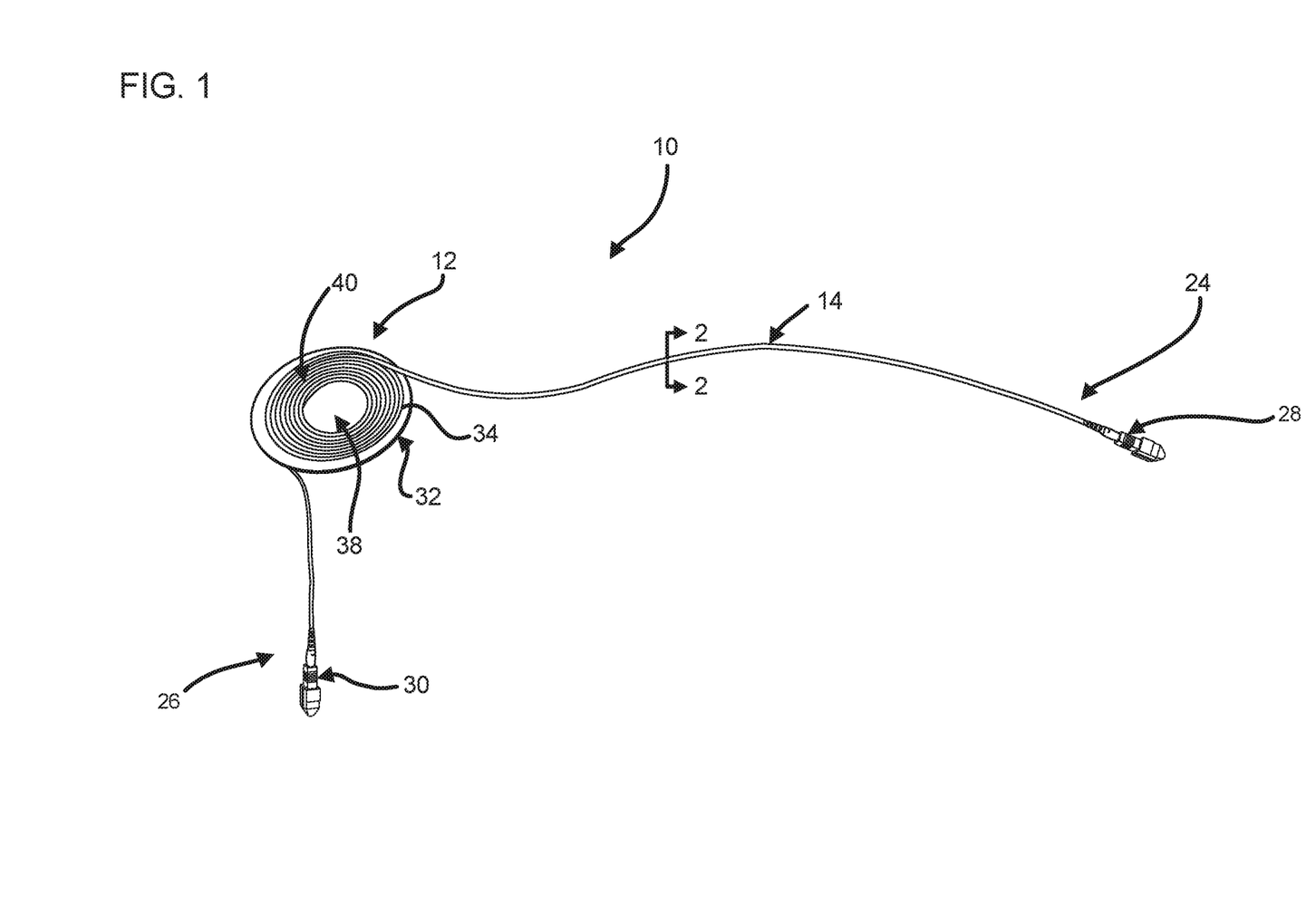
FIG. 1 illustrates a perspective view of a telecommunications device for dispensing a fiber optic patch cord that includes a fiber optic cable and fiber optic connectors in accordance with principles of the present disclosure.

The present disclosure relates to an advantageous example telecommunications device that manages fiber optic patch cord cables. Referring to FIG. 1, an example telecommunications device 10 for dispensing a fiber optic patch cord is illustrated. The telecommunications device 10 includes a fiber optic patch cord 12 and a management body 32 (e.g., securing structure, disk, plate, cardboard, etc.). In certain examples, the management body 32 is a relatively thin, inexpensive, sheet-like substrate, although alternatives are possible. In certain examples, the management body 32 is a plastic or polymeric sheet, although alternatives are possible.

The fiber optic patch cord 12 includes a fiber optic cable 14. Although a single-fiber patch cord is shown, the features and advantages of the present disclosure may also relate to a multi-fiber patch cord.

Figure 2:
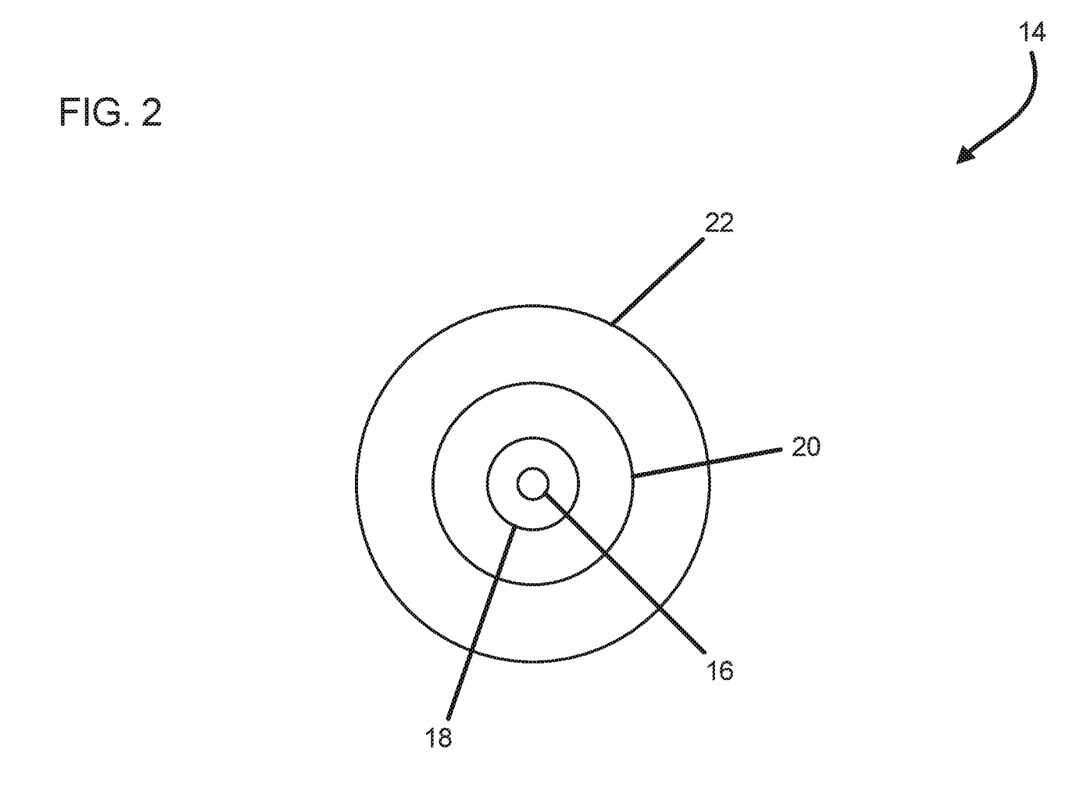
FIG. 2 is a cross-sectional view taken along section line 2-2 of the fiber optic cable shown in FIG. 1.

Referring to FIG. 2, a cross-sectional view of the fiber optic cable 14 is shown. The fiber optic cable 14 typically includes an optical fiber having a core 16 surrounded by a cladding layer 18. In certain embodiments, the fiber optic cable 14 includes one or more coating layers 20 surrounding the cladding layer 18. In certain embodiments, the coating layer or layers 20 can include a polymeric material such as acrylate having an outer diameter in the range of about 230-260 microns. In still other embodiments, the coating layer/layers 20 can be surrounded by a buffer layer 22 (e.g., a tight or loose buffer layer) having an outer diameter in the range of about 500-1100 microns. A plurality of reinforcing members can loosely surround the buffer layer. The fiber optic cable may also include an outer jacket. The core 16 and the cladding layer 18 of the optical fiber are typically made of a glass material.

Figure 3:
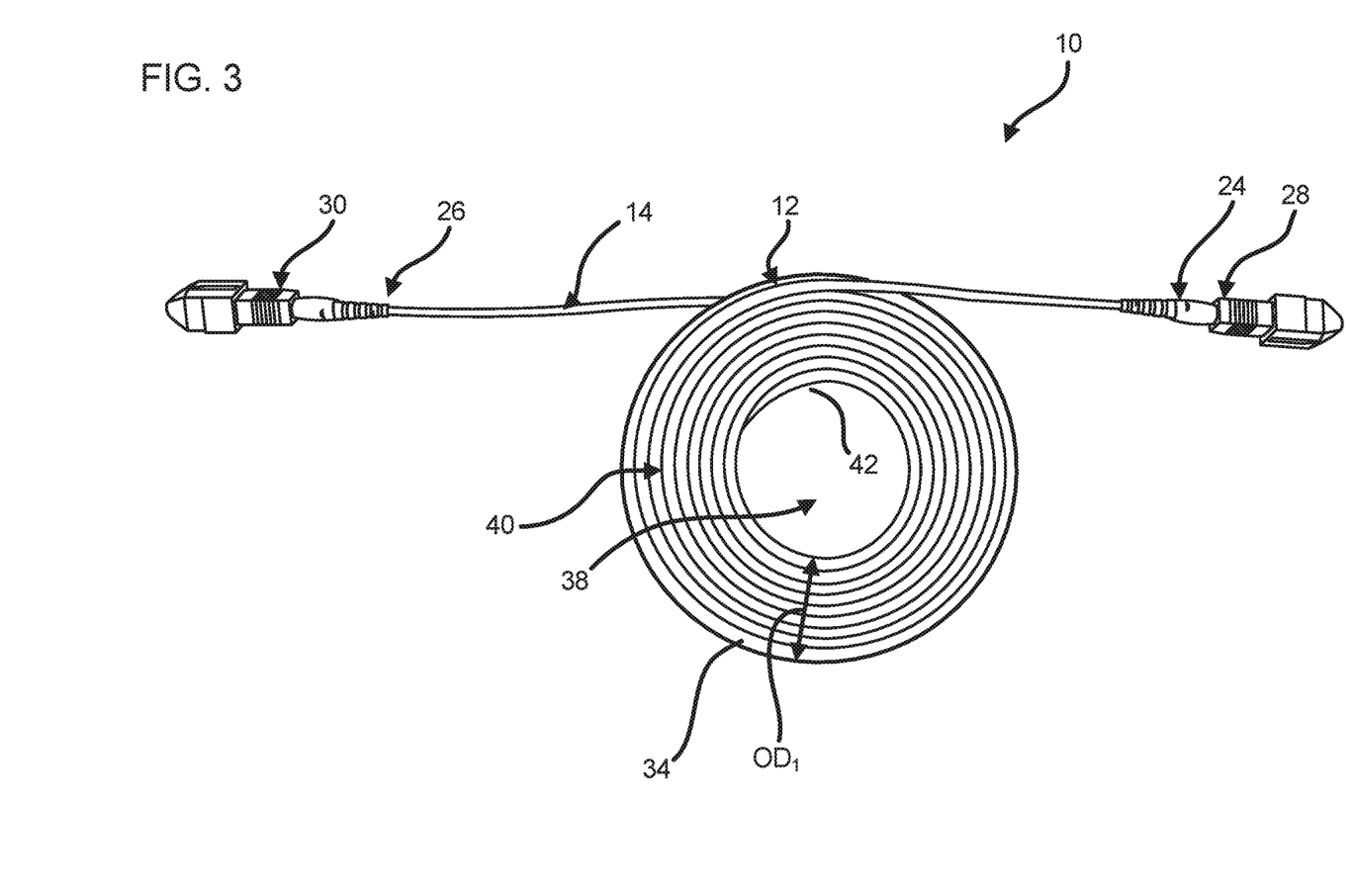
FIG. 3 illustrates a front elevation view of the telecommunications device of FIG. 1.

Turning again to FIG. 3, the fiber optic cable 14 has a first end 24 and an opposite second end 26. A first fiber optic connector 28 can be mounted at the first end 24 of the fiber optic cable 14 of the fiber optic patch cord 12 and a second fiber optic connector 30 can be mounted at the second end 26 of the fiber optic cable 14. The connector can be one of a variety of well-known connector types, including SC, FC, ST, LX, LC, and others.

Figure 4:
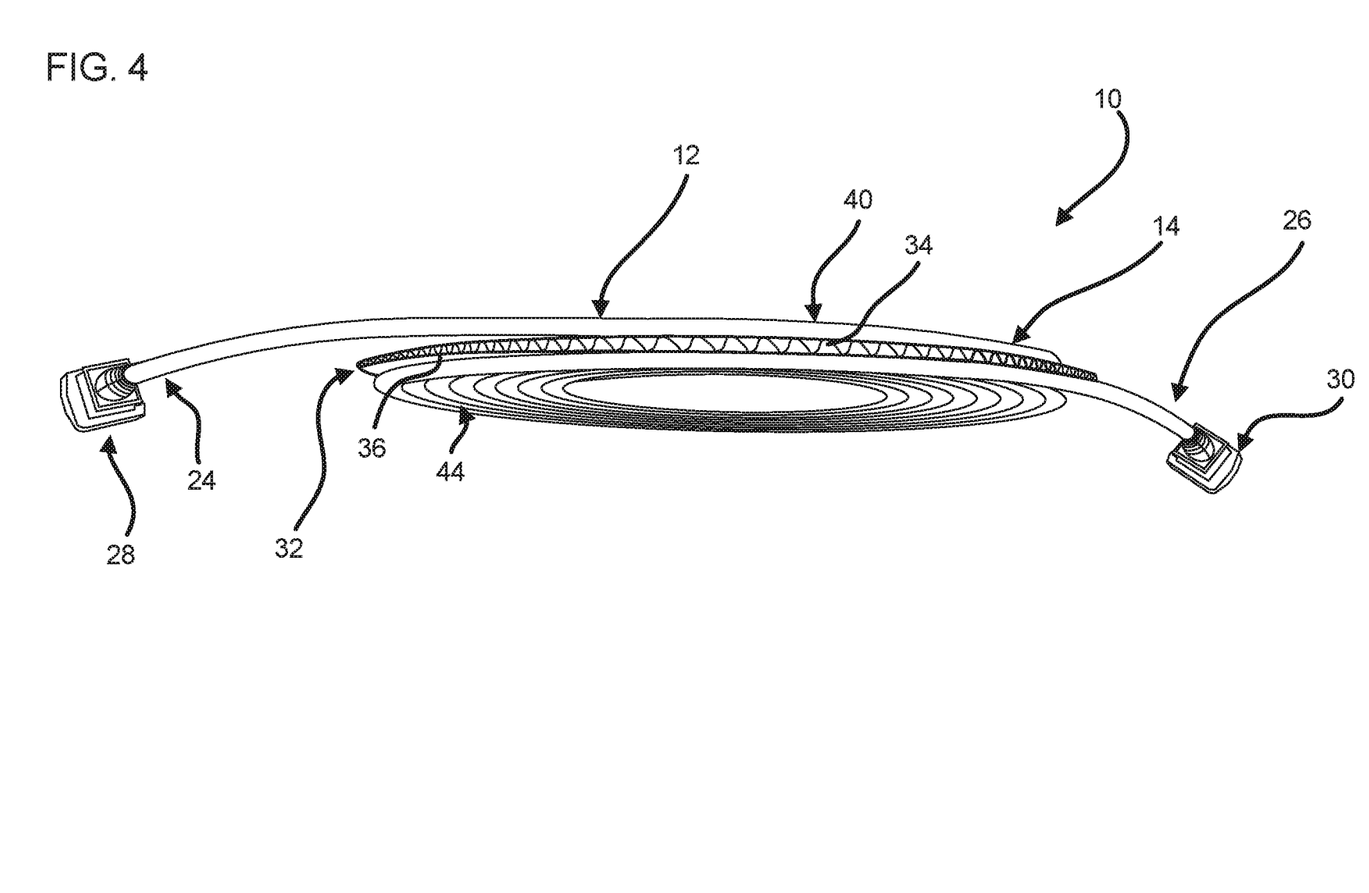
FIG. 4 illustrates a top view of the telecommunications device of FIG. 3.

The management body 32 includes a first side 34 (e.g., front side)(see FIGS. 1 and 3) and an opposite second side 36 (e.g., back side)(see FIG. 4). In certain examples, a binding material (e.g., adhesive, re-adherable double-faced tape, pressure sensitive adhesive) can be disposed on the first and second sides 34, 36 of the management body 32 for temporarily securing the fiber optic cable 14 to the first and second sides 34, 36 of the management body 32. Alternatively, a binding material can be applied to the fiber optic cable 14.

In certain examples, the management body 32 can define an opening (e.g., hole, aperture) 38 that extends between the first and second sides 34, 36. In certain examples, the opening is a central opening, although alternatives are possible.

Turning to FIG. 4, the fiber optic cable 14 can include a first spiral coil portion 40 that is arranged and configured to be disposed directly on the adhesive applied first side 34 of the management body 32. The first spiral coil portion 40 can be arranged and configured to be detachably secured to the first side 34 of the management body 32. The first spiral coil portion 40 can be wound around the opening 38 of the management body 32 such that the first fiber optic connector 28 is positioned on an outer diameter $OD_1$ (see FIG. 3) of the first spiral coil portion 40.

In certain examples, the fiber optic cable 14 may include a middle portion 42 arranged and configured to route through the opening 38 of the management body 32, although alternatives are possible. The middle portion 42 can be routed through the opening 38 to the second side 36 of the management body 32.

Figure 5:
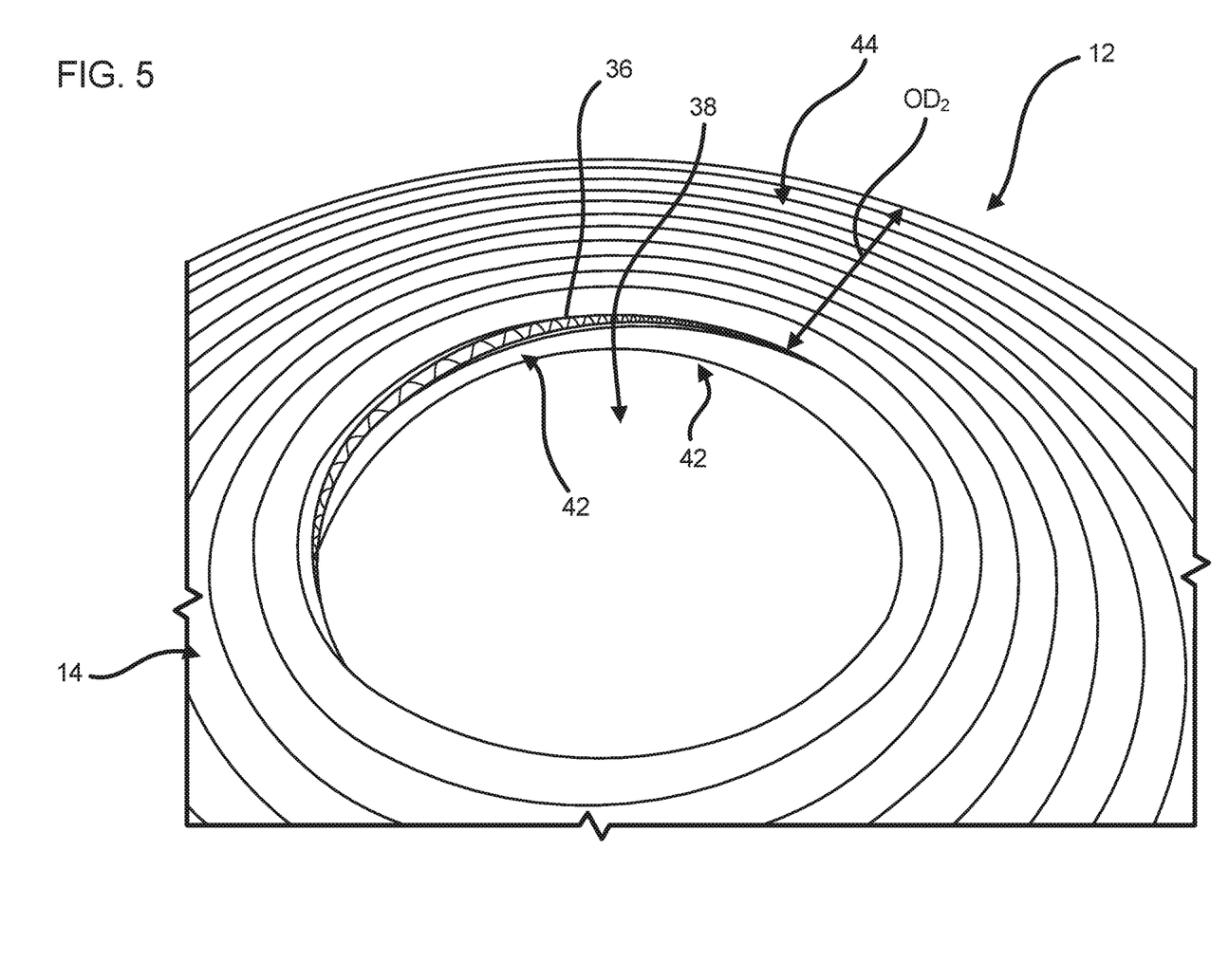
FIG. 5 illustrates a perspective view of the telecommunications device of FIG. 1 depicting a middle portion of the fiber optic patch cord.

The fiber optic cable 14 can also include a second spiral coil portion 44 that is arranged and configured to be disposed directly on the adhesive applied second side 36 of the management body 32. The second spiral coil portion 44 can be wound around the opening 38 of the management body 32 such that the second fiber optic connector 30 is positioned on an outer diameter $OD_2$ (see FIG. 5) of the second spiral coil portion 44. The second spiral coil portion 44 can be arranged and configured to be detachably secured to the second side 36 of the management body 32.

In certain examples, the outer diameters $OD_1$, $OD_2$ may range from about 2 meters to about 10 meters, although alternatives are possible. The outer diameters $OD_2$, $OD_1$ of the first and second spiral coil portions 40, 44 may vary based on the thickness of the fiber optic patch cord 12. The outer diameters $OD_1$, $OD_2$ of the first and second spiral coil portions 40, 44 may also vary based on the type of cable.

The first spiral coil portion 40 can be coiled on the first side 34 of the management body 32 from the outside toward the opening 38 of the management body 32. Once the first spiral coil portion 40 reaches the opening 38, or is the same diameter as the opening 38, the middle portion 42 of the fiber optic cable 14 can be routed through the opening 38 such that the second spiral coil portion 44 can be coiled on the opposite, second side 36 of the management body 32 where the second spiral coil portion 44 is coiled out from the opening 38 toward the outside.

In certain embodiments, the management body 32 may not define an opening. As such, the first and second spiral coil portions 40, 44 can be coiled on respective first and second sides 34, 36 of the management body 32 such that the first fiber optic connector 28 is positioned on the outer diameter of the first spiral coil portion 40 and the second fiber optic connector 30 is positioned on an inner diameter of the second spiral coil portion 44, although alternatives are possible.

The fiber optic patch cord 12 can be easily managed on the management body 32. The telecommunications device 10 can help manage the fiber optic patch cord 12 during shipping and storing the fiber optic patch cord 12 in any patching environment. The management body 32 can be arranged and configured to maintain bend radius requirements such that the fiber optic patch cord 12 is less susceptible to twist and/or entanglements.

The first and second spiral coil portions 40, 44 can be detached from respective first and second sides 34, 36 of the management body 32. The binding material can have less adhesive strength with respect to the first and second spiral coil portions 40, 44 as compared to the material of the management body 32. Accordingly, because of this lower adhesion to the first and second spiral coil portions 40, 44 no residues remain on the first and second spiral coil portions 40, 44 when the first and second spiral coil portions 40, 44 are detached or peeled from the management body 32. The first and second spiral coil portions 40, 44 can be re-adherable to the management body 32 such that extended or excess length of the fiber optic cable 14 may be rewound and stored on the management body 32.

The first and second spiral coil portions 40, 44 of the fiber optic cable 14 can be easily dispensed or deployed from both the first and second sides 34, 36 of the management body 32. The first and second spiral coil portions 40, 44 can be pulled in order to deploy the fiber optic cable 14. In certain examples, the first and second fiber optic connectors 28, 30 can be deployed from respective first and second spiral coil portions 40, 44 at different lengths. In certain examples, the first and second fiber optic connectors 28, 30 can be deployed from respective first and second spiral coil portions 40, 44 at equal lengths, although alternatives are possible. It will be appreciated that the first and second spiral coil portions 40, 44 can be deployed in opposite directions, although alternatives are possible. In certain examples, the first and second spiral coil portions 40, 44 can be deployed in the same direction.

The telecommunications device 10 can be placed in a cabinet, patch panel, or separately mounted to a structure to fix the telecommunications device 10. In certain examples, an attachment structure may be attached to the management body 32 to hang the telecommunications device 10. In certain examples, a post (e.g., rod, hook, etc.) may be mounted through the opening 38 of the management body 32 to hang the telecommunications device 10.

Figure 6:
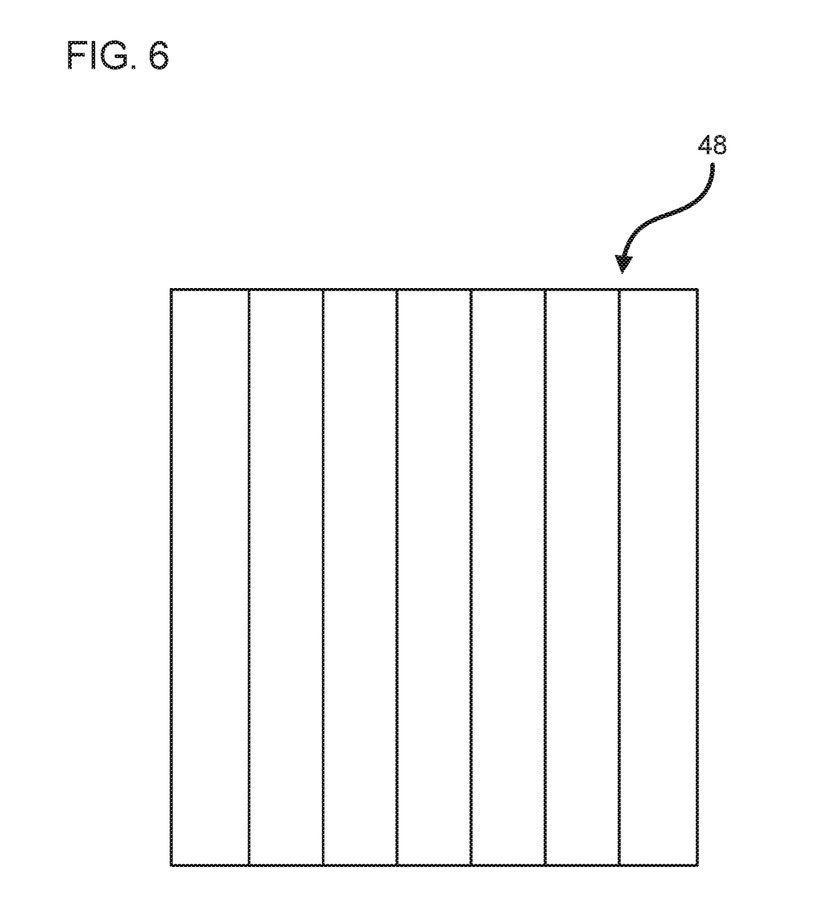
FIG. 6 illustrates an example bookshelf for storage of the fiber optic patch cord of FIG. 1 in accordance with principles of the present disclosure.

In certain examples, spiraled re-adherable fiber optic pigtails can be stored in a bookshelf 48 (see FIG. 6), although alternatives are possible. In certain examples, spiraled re-adherable fiber optic pigtails can be adapted for panel type installations.

Figure 7:
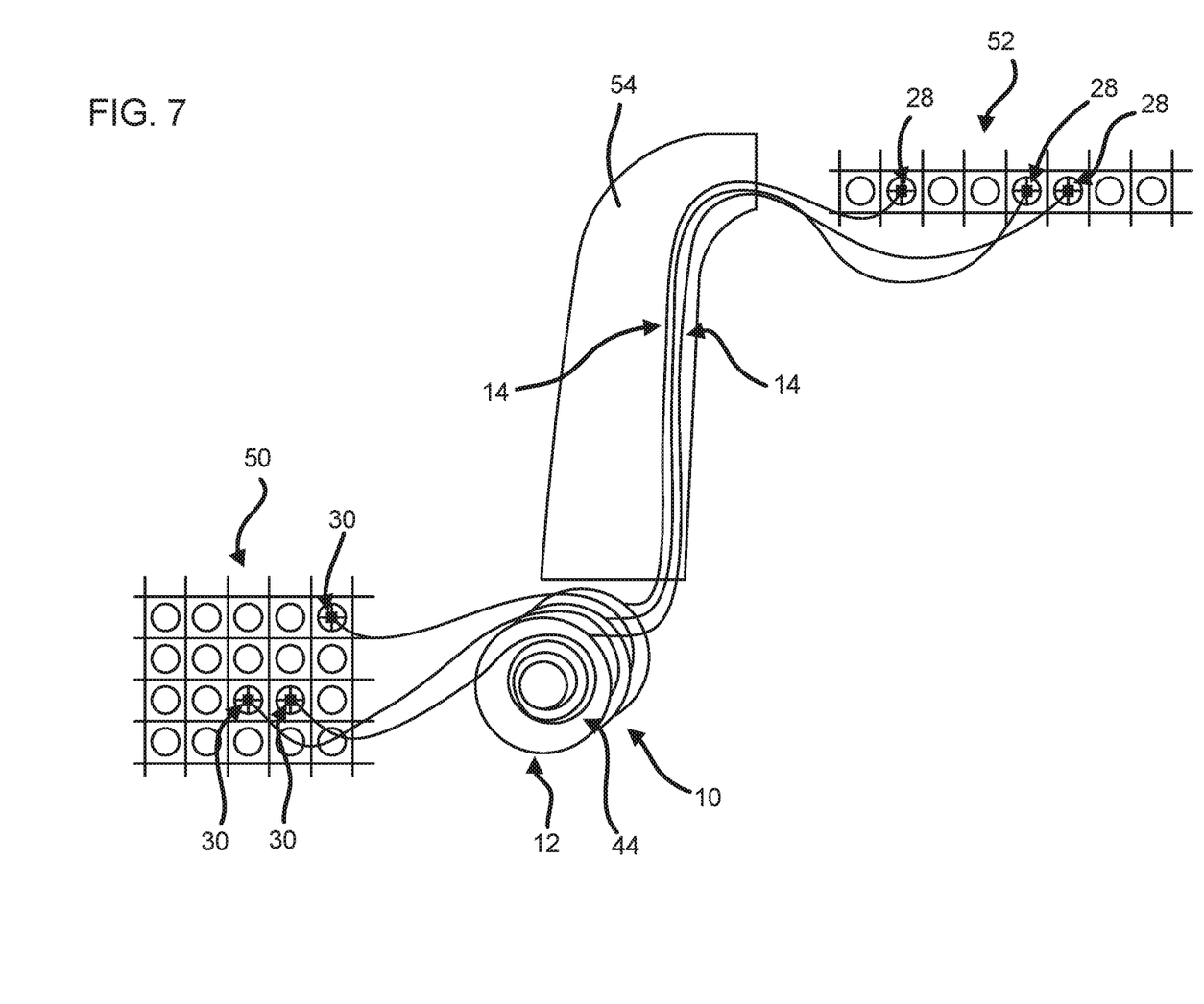
FIG. 7 illustrates a runway plate for use with the telecommunications device of FIG. 1 in accordance with principles of the present disclosure.

In certain examples, spiraled re-adherable fiber optic pigtails can be adapted for panel type installations. Turning to FIG. 7, the first and second fiber optic connectors 28, 30 can be deployed from respective first and second spiral coil portions 40, 44 to respective first and second patch panels 50, 52. Once deployed, a runway plate 54 may be used to help organize the deployed fiber optic cable 14 between the first and second patch panels 50, 52 in a neat and uncluttered way. In certain examples, the runway plate 54 may be configured as a flat plate or a straight plate, although alternatives are possible. In certain examples, the runway plate 54 may include a bend portion 56 (e.g., curved portion). The runway plate 54 may provide an installer with a clear visual routing map for re-patching needs.

In certain examples, the runway plate 54 may include grooves to temporarily hold and receive the fiber optic cable 14 in an organized manner. In certain examples, the runway plate 54 may include a binding material (e.g., adhesive, re-adherable double-faced tape, pressure sensitive adhesive) for temporarily securing the deployed fiber optic cable 14 thereon, although alternatives are possible. In certain examples, a binding material may be provided on an outer jacket of the fiber optic cable 14 for temporarily securing the deployed fiber optic cable 14, although alternatives are possible. In certain examples, the deployed fiber optic cable 14 may be temporarily secured to the runway plate 54 by clamps, hooks, clamps, clasps, couplings or fastenings of a general nature.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A telecommunications device, comprising:
    a fiber optic patch cord including:
        a fiber optic cable;
        a first fiber optic connector mounted on a first end of the fiber optic cable of the fiber optic patch cord;
        a second fiber optic connector mounted on a second end of the fiber optic cable of the fiber optic patch cord;
    a securing structure having a first side and an opposite second side for detachably securing the fiber optic patch cord, the securing structure defining an opening that extends between the first and second sides, wherein adhesive is disposed on both the first and second sides of the securing structure for temporarily securing the fiber optic cable to the first and second sides of the securing structure;
    a first spiral coil portion of the fiber optic cable disposed directly on the first side of the securing structure, the first spiral coil portion of the fiber optic cable being wound around the opening of the securing structure such that the first fiber optic connector is positioned on an outer diameter of the first spiral coil portion;
    a middle portion of the fiber optic cable being configured to route through the opening of the securing structure; and
    a second spiral coil portion of the fiber optic cable disposed directly on the second side of the securing structure, the second spiral coil portion of the fiber optic cable being wound around the opening of the securing structure such that the second fiber optic connector is positioned on an outer diameter of the second spiral coil portion.

2. The telecommunications device of claim 1, wherein the securing structure is a substantially flat substrate.

3. The telecommunications device of claim 1, wherein the first and second spiral coil portions are coated with the adhesive.

4. The telecommunications device of claim 1, wherein the adhesive is a pressure sensitive adhesive.

5. The telecommunications device of claim 1, wherein the adhesive is a silicone adhesive gel.

6. The telecommunications device of claim 1, wherein the first and second spiral coil portions each have an outer diameter that ranges from about 2 m to about 10 m.

7. The telecommunications device of claim 1, wherein the fiber optic cable is dispensed from both the first and second sides of the securing structure.

8. The telecommunications device of claim 1, wherein the first and second spiral coil portions are peelable from the securing structure and re-adherable to the securing structure.

9. The telecommunications device of claim 1, wherein the fiber optic patch cord has a thickness of from about 2 mm to about 3 mm.

10. The telecommunications device of claim 1, wherein the first and second fiber optic connectors each comprise a housing and a fiber boot.

11. A telecommunications device, comprising:
    a fiber optic patch cord including:
        a fiber optic cable;
        a first fiber optic connector mounted on a first end of the fiber optic cable of the fiber optic patch cord;
        a second fiber optic connector mounted on a second end of the fiber optic cable of the fiber optic patch cord;
    a securing structure having a first side and an opposite second side for detachably securing the fiber optic patch cord, wherein adhesive is disposed on both the first and second sides of the securing structure for temporarily securing the fiber optic cable to the first and second sides of the securing structure;
    a first spiral coil portion of the fiber optic cable disposed directly on the first side of the securing structure; and
    a second spiral coil portion of the fiber optic cable disposed directly on the second side of the securing structure;

wherein the first and second spiral coil portions are peelable from the securing structure and re-adherable to the securing structure.

12. The telecommunications device of claim 11, wherein the securing structure is a substantially flat substrate.

13. The telecommunications device of claim 11, wherein the first and second spiral coil portions are coated with the adhesive.

14. The telecommunications device of claim 11, wherein the adhesive is a pressure sensitive adhesive.

15. The telecommunications device of claim 11, wherein the adhesive is a silicone adhesive gel.

16. The telecommunications device of claim 11, wherein the first and second spiral coil portions each have an outer diameter that ranges from about 2 m to about 10 m.

17. The telecommunications device of claim 11, wherein the fiber optic cable is dispensed from both the first and second sides of the securing structure.

18. The telecommunications device of claim 11, wherein the fiber optic patch cord has a thickness of from about 2 mm to about 3 mm.

19. The telecommunications device of claim 11, wherein the first and second fiber optic connectors each comprise a housing and a fiber boot.

20. A method of using the telecommunications device of claim 11, the method comprising:
    detaching the first and second spiral coil portions from respective first and second sides of the securing structure; and
    pulling the first and second spiral coil portions to deploy the fiber optic cable.

* * * * *